United States Patent
Gisler et al.

(10) Patent No.: US 7,299,817 B2
(45) Date of Patent: Nov. 27, 2007

(54) PASSIVE, DOUBLE ACTING, VACUUM ACTUATED VENT VALVE

(75) Inventors: Gary L. Gisler, Glendale, AZ (US); James T. Hanks, Peoria, AZ (US); Carlos J. Stevens, Peoria, AZ (US); Robert E. Winkel, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 324 days.

(21) Appl. No.: 10/933,093

(22) Filed: Sep. 1, 2004

(65) Prior Publication Data

US 2006/0042697 A1  Mar. 2, 2006

(51) Int. Cl.
  *F16K 17/36* (2006.01)
  *G05D 16/06* (2006.01)
(52) U.S. Cl. ..................... 137/81.1; 137/78.5
(58) Field of Classification Search ............ 137/78.5, 137/81.1, 81.2
  See application file for complete search history.

(56) References Cited

U.S. PATENT DOCUMENTS

| 1,557,822 | A | * | 10/1925 | Foulk | 137/81.1 |
| 2,168,536 | A | * | 8/1939 | Olshevsky | 137/81.1 |
| 2,902,916 | A | * | 9/1959 | Smith | 137/81.1 |
| 2,963,034 | A | * | 12/1960 | Cummins | 137/81.1 |
| 2,969,801 | A | * | 1/1961 | Cummins | 137/81.1 |
| 3,709,242 | A | * | 1/1973 | Chase | 137/81.1 |
| 3,804,167 | A | | 4/1974 | Swift | |
| 5,743,292 | A | | 4/1998 | Robinson | |

FOREIGN PATENT DOCUMENTS

DE  4103769 C1  6/1992

OTHER PUBLICATIONS

Vent Valve Specification Sheet, Dec. 19, 1978.
PCT International Search Report PCT/US2005/031498, Nov. 30, 2006.

* cited by examiner

*Primary Examiner*—John Rivell
(74) *Attorney, Agent, or Firm*—Ingrassia Fisher & Lorenz

(57) ABSTRACT

A valve is provided for use on a control moment gyroscope (CMG) having a housing separating an internal environment from an external environment. The valve includes a valve housing, a valve element, and bellows. The valve housing is configured to couple to the CMG housing and includes an inner surface defining a cavity, an outer surface, and an opening extending therebetween. The valve element is disposed within the valve housing cavity and is movable between a closed position, in which fluid is prevented from flowing through the valve housing opening, and an open position, in which fluid may flow through the valve housing opening. The bellows is disposed within the valve housing and coupled to the valve element and has an internal chamber. The bellows selectively moves the valve element closed and open in response to a differential pressure between the bellows internal chamber and the valve housing cavity.

15 Claims, 5 Drawing Sheets

US 7,299,817 B2

PASSIVE, DOUBLE ACTING, VACUUM ACTUATED VENT VALVE

FIELD OF THE INVENTION

The present invention generally relates to control moment gyroscopes or reaction wheels, and more particularly relates to a vent valve for use on a control moment gyroscope or a reaction wheel.

BACKGROUND OF THE INVENTION

The attitude of a spacecraft may be controlled by various rotating inertia members, such as a reaction wheel or a control moment gyroscope (CMG). A CMG typically comprises a rotor with a fixed or variable spin rate, spinning up to 6000 rpm. The CMG may also include a gimbal assembly coupled to the rotor. The spin axis of the CMG can be tilted by moving the CMG using the gimbal assembly. This motion produces a gyroscopic torque orthogonal to the spin axis and gimbal axis.

Typically, the CMG rotor is disposed within an evacuated housing to reduce windage drag. To eliminate pressure build-up within the housing during rotor spin, at least one housing vent is provided in the CMG housing. The housing vent may be equipped with a valve that is closed when a pressure differential exists between the CMG housing and external environment and is opened when the two pressures are substantially the same.

Conventionally, a single-acting, passive vent valve has been used on CMG housing vents. The vent valve is generally coupled to the CMG housing and is in fluid communication with one of the housing vents. The vent valve is configured to vent gases between the interior and exterior of the CMG housing when the CMG is placed in a thermal vacuum chamber and the pressure is reduced during testing, or as the CMG travels out of the earth's atmosphere and reaches orbit.

Although the conventional vent valve is safe and effective, it suffers certain drawbacks. First, because the vent valve is single-acting, it typically needs to be re-seated to operate. To re-seat the vent valve, the vent valve is manually re-seated. In some configurations, the vent valve includes a valve cover that is removed. However, when the CMG is incorporated into a relatively large spacecraft the vent valve may be inaccessible, which can make manual removal of the valve cover and re-seating of the vent valve problematic. Additionally, the sealing force in the conventional vent valve may be relatively low. As a result, small leaks may develop over time, increasing the need for valve maintenance and causing reduced-efficiency CMG operation during ground testing.

Accordingly, a valve capable of passive re-seating is desirable. In addition, a valve having a higher sealing force and that requires minimal valve maintenance is also desirable. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A valve is provided for use on a control moment gyroscope (CMG) housing having an interior. The valve includes a valve housing, a valve element, and bellows. The valve housing is configured to couple to the CMG housing and includes an inner surface that defines a cavity, an outer surface, and an opening extending therebetween. The valve element is disposed at least partially within the valve housing cavity and movable between a closed position, in which fluid is prevented from flowing through the valve housing opening, and an open position, in which fluid may flow through the valve housing opening. The bellows is disposed within the valve housing and coupled to the valve element. The bellows has an internal chamber and is configured to selectively move the valve element between the closed and open position in response to a differential pressure between the bellows internal chamber and the valve housing cavity.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. The invention may be used in conjunction with any system having a first environment where the system may be exposed to a second environment, wherein it may be desirable to selectively separate the first and second environments. Such systems include, but are not limited to evacuated components that may be used on a spacecraft, aircraft, watercraft, or any other type of craft.

Figure 1:
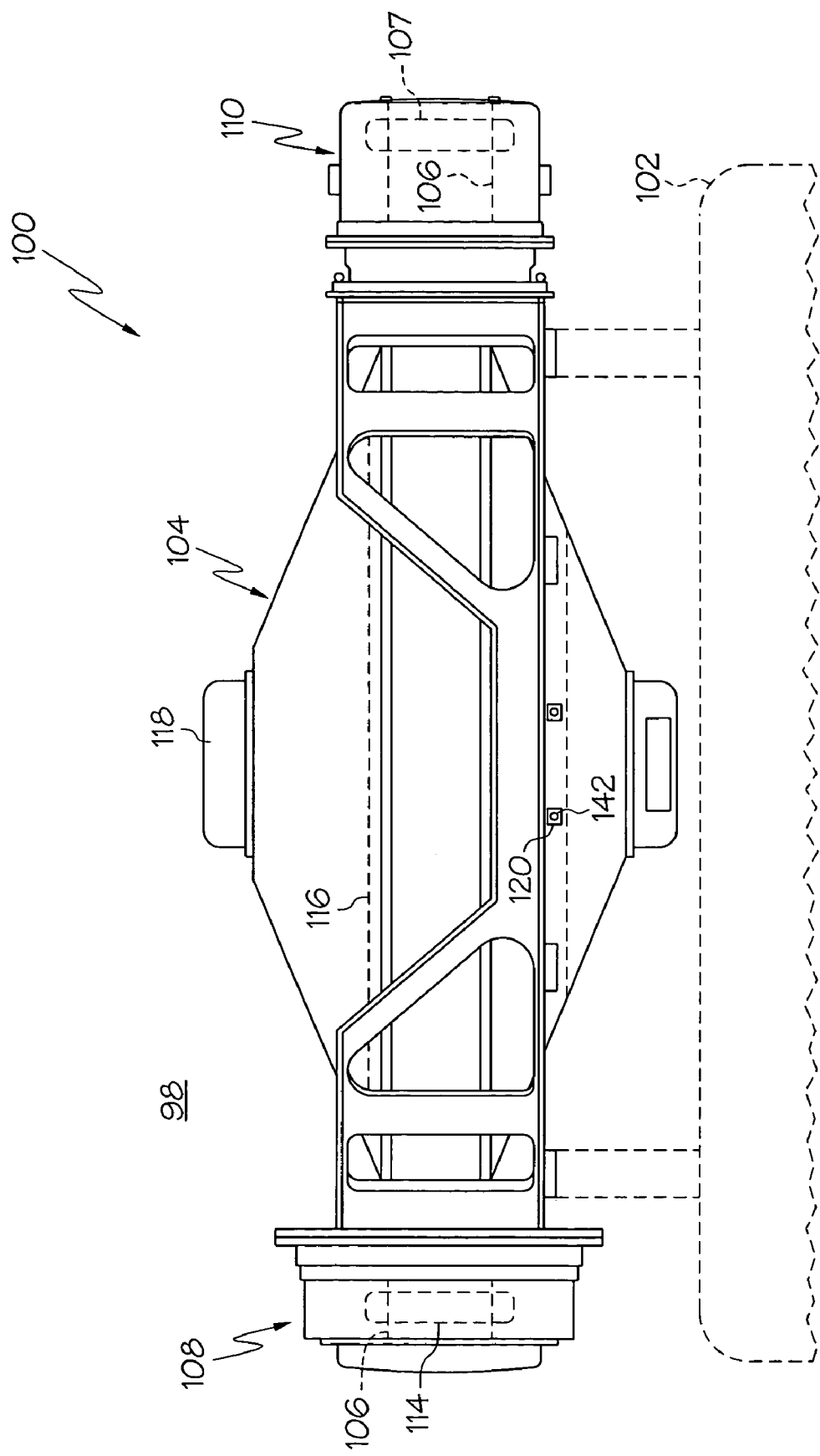
FIG. 1 is a perspective view of an exemplary control moment gyroscope, according to the present invention, may be used.

FIG. 1 illustrates an exemplary control moment gyroscope (CMG) 100 that is mounted on a spacecraft 102. The CMG 100 includes an inner gimbal assembly 104, a torque motor assembly 108, and slip ring assembly 110. The torque motor assembly 108 is coupled to one end of the inner gimbal assembly 104 and generally includes a gimbal shaft 106 to which a gimbal motor 114 is coupled. The gimbal motor 114 supplies power to rotate the inner gimbal assembly 104 about a gimbal axis. The rate at which the inner gimbal assembly 104 spins may be monitored by a rate sensor (not shown) that optionally may be coupled to the torque motor assembly 108. The slip ring assembly 110 is coupled to the other end of the inner gimbal assembly 104 and includes a slip rings 107 for transferring electrical power to a spin motor 118, which will be described further below.

The inner gimbal assembly 104 includes a rotor 116 disposed therein which is coupled to the spin motor 118, which configured to provide power to the rotor 116 causing it to spin about a predetermined rotor axis at a predetermined angular rate, such as, for example, up to 6000 rpm. The inner gimbal assembly 104 is substantially sealed to separate its internal environment from the ambient environment 98 surrounding the CMG 100. To decrease the effects of, among other causes, windage drag and spin bearing drag, the sum of which may affect the spin rate of the rotor 114, the internal environment of the inner gimbal assembly 104 is preferably evacuated to substantially 0 psi. The inner gimbal assembly 104 includes at least one assembly opening 142 formed-thereon to selectively vent its internal contents to the ambient environment 98 when ambient pressure and the interior of the inner gimbal assembly 104 are at a predetermined pressure differential, such as when the spacecraft 102 approaches or is in a vacuum environment. To control the venting, at least one valve 120, which is in fluid communication with the assembly opening 142, is coupled to the inner gimbal assembly 104. The valve 120, which will now be discussed in detail, is configured to passively control the venting.

Figure 2:
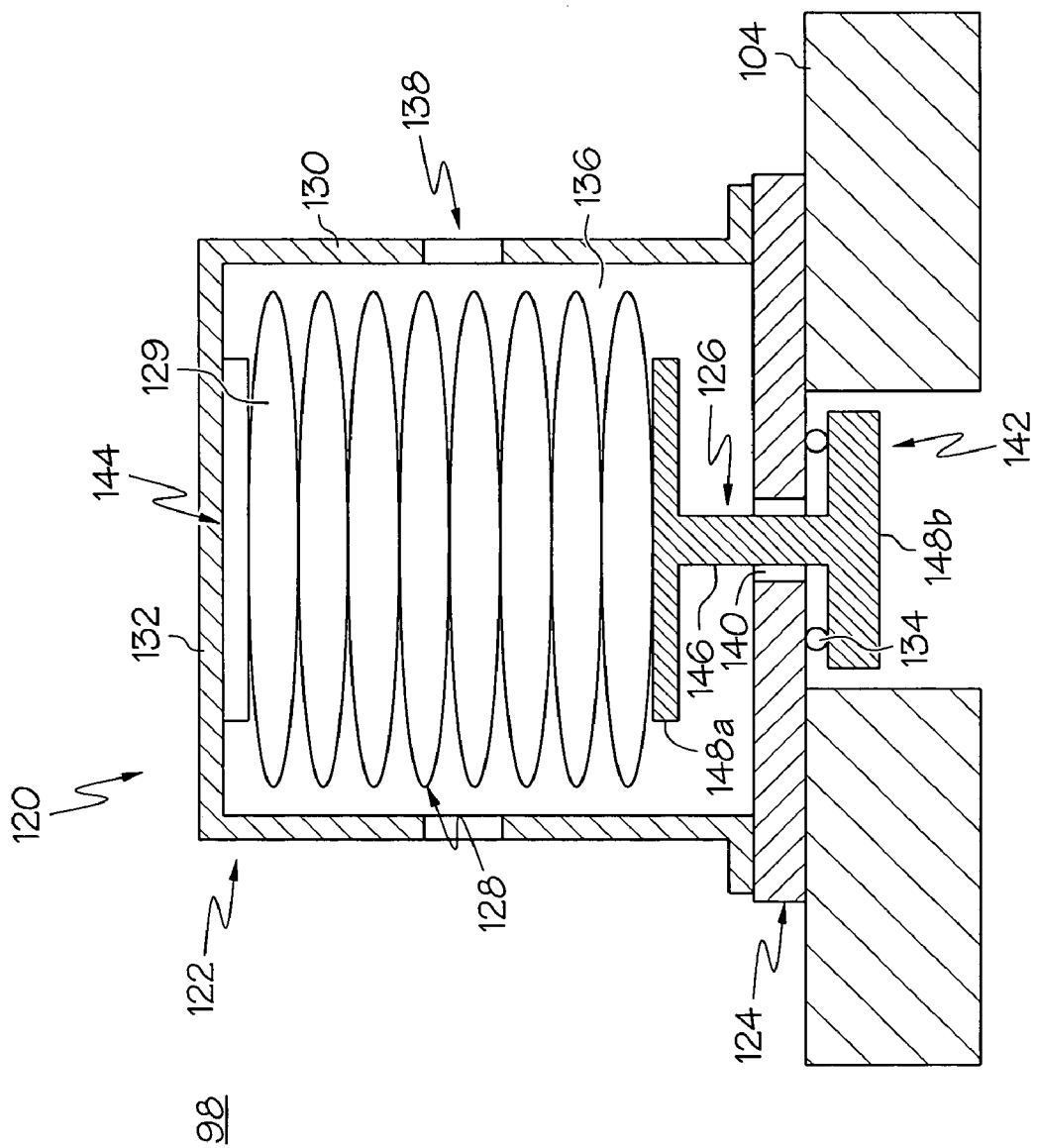
FIG. 2 is a schematic of an exemplary valve that may be used with the control moment gyroscope depicted in FIG. 1.

Turning to FIG. 2, an exemplary embodiment of the valve 120 is provided. Generally, the valve 120 includes a valve housing 122, a valve seat 124, a valve element 126, and sealed bellows 128. The valve housing 122 has sidewalls 130 and a top wall 132; however, it will be appreciated that in other embodiments, the valve housing 122 may have more or fewer walls. At least one vent aperture 138 is formed through the valve housing 122 to vent the cavity 136 to an ambient environment 98 surrounding the valve housing 122. The vent aperture 138 may be formed into one or more of the sidewalls 130, the top wall 132, or both. The valve housing 122 may be constructed of any one of numerous materials capable of withstanding the pressure and temperature changes to which it is exposed. Such materials include, for example, ferrous/non-ferrous metals or plastics.

The valve seat 124 is coupled to the valve housing 122 to define a cavity 136 therein. In one exemplary embodiment, the valve seat 124 is a wall of the valve housing 122. The valve seat 124 includes a valve opening 140 and a seal element 134. The valve opening 140 is formed through the valve seat 124 and is in fluid communication with the assembly opening 142. The seal element 134 is coupled proximate the valve opening 140. In this embodiment, the seal element 134 is coupled to the bottom surface of the valve seat 124; however, it will be appreciated that the seal element 134 may be located anywhere in the valve 120 so as to provide a contact surface against which the valve element 126 seats, and thereby seal the internal environment of the inner gimbal assembly 104 from the ambient environment 98. The seal element 134 may have any one of a number of different sealing configurations, such as an O-ring, gasket, gland, or taper seat seal or any other type of sealing mechanism.

The valve element 126 is partially disposed within the valve housing 122 and is moveable between a closed position and an open position. In the closed position, the valve element 126 contacts the valve seat 124 and/or sealing element 134 and prevents fluid flow through the valve opening 140. Conversely, in the open position, the valve element 126 does not contact the valve seat 124 and/or sealing element 134 allowing fluid to flow through the valve opening 140. The valve element 126, depicted in FIG. 2, includes a valve shaft 146, and a first and a second plate 148a, 148b that are each coupled to either end of the valve shaft 146. The valve shaft 146 is slidably disposed within the valve opening 140, while the first plate 148a is disposed within the cavity 136 and the second plate 148b is outside of the valve housing 122. The second plate 148b is configured to contact the valve seat 124. As will be appreciated by those with skill in the art, the valve element 126 may have any one of numerous other configurations that are capable of blocking and unblocking the valve opening 140, including, but not limited to, a plunger configuration.

The bellows 128 is coupled to the valve element 126 and has a sealed interior chamber 129 that is pressurized to a predetermined pressure magnitude, for example, between 0 psi and 20 psi. Thus, the bellows 128 will expand and contract in response to a pressure differential between the bellows interior chamber 129 and the valve housing cavity 136. Because the bellows 128 is coupled to the valve element 126, the expansion and contraction of the bellows 128 moves the valve element 126 between the open and closed position, respectively. For example, in the embodiment illustrated in FIG. 2, if the bellows interior chamber 129 is evacuated and the valve 120 is exposed to a pressure that is greater than 0 psi, the bellows 128 contracts and pulls the valve shaft 146 upward until the second plate 148b contacts and seats against the valve seat 124. Consequently, the valve 120 is in a closed position. If the bellows 128 is exposed to a pressure of substantially 0 psi, such as when it is in space, the bellows 128 freely expands so that the second plate 148b is not in contact with the sealing mechanism 142 and the valve 120 is in an open position.

In addition to being coupled to the valve element 126, the bellows 128 preferably is coupled to the valve housing 122 or another part of the valve 120 to provide a reference point from which the bellows 128 expands and contracts. In the embodiment depicted in FIG. 2, the bellows 128 is disposed within the cavity 136 and can be any one of numerous suitable sizes so that the bellows 128 may be housed within the valve housing 122. In some embodiments, one or more bellows 128 may be sized slightly smaller than the valve housing 122. In such case, one or more shims 144 is placed between the bellows 128 and housing 122 in order to obtain a sufficient amount of force against the valve seat 124 and/or pressure to open the valve 120. In another exemplary embodiment, the bellows 128 is positioned outside of the valve housing 122.

Figure 4:
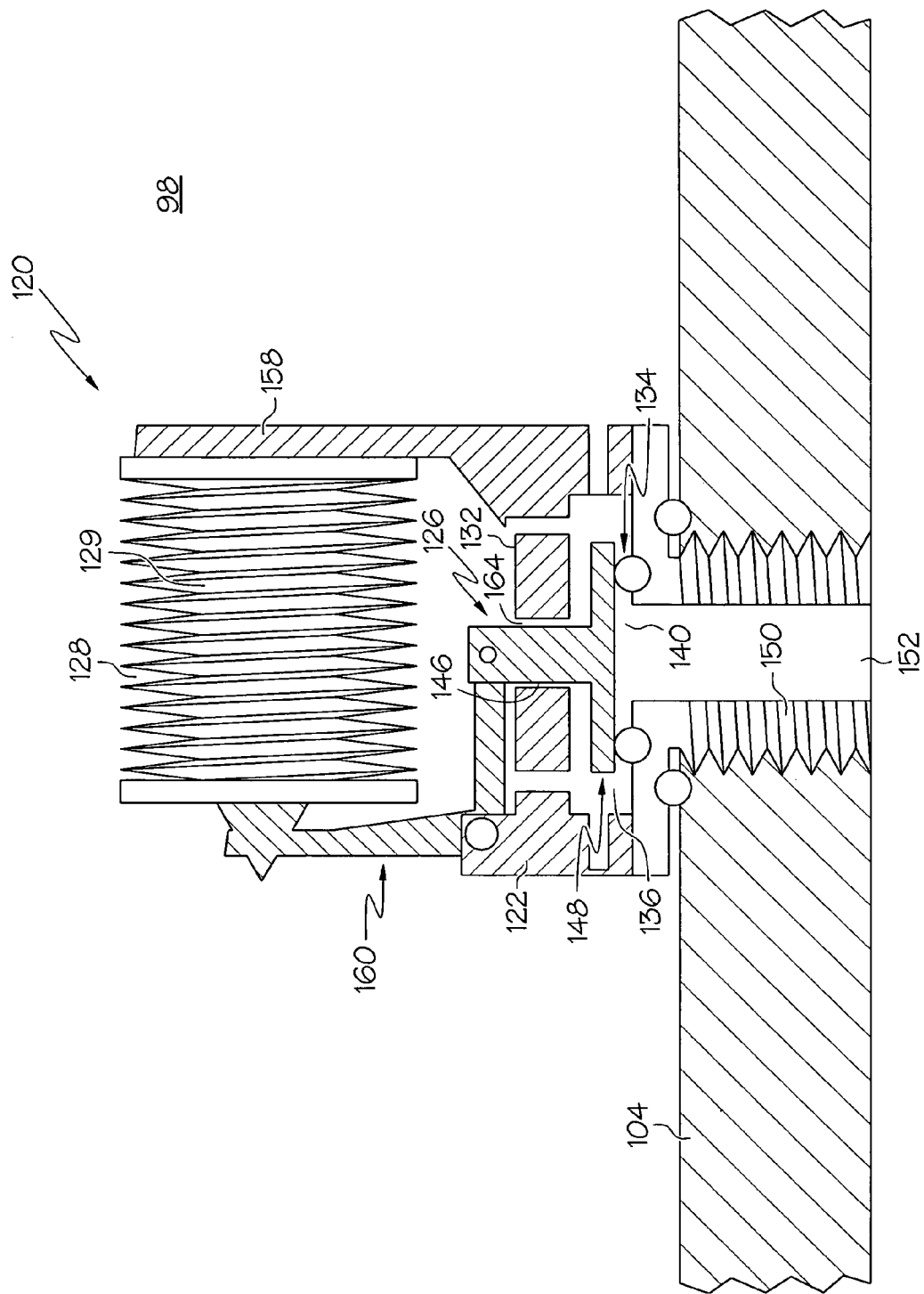
FIG. 4 is a schematic of yet another exemplary valve that may be used with the control moment gyroscope depicted in FIG. 1.
Figure 5:
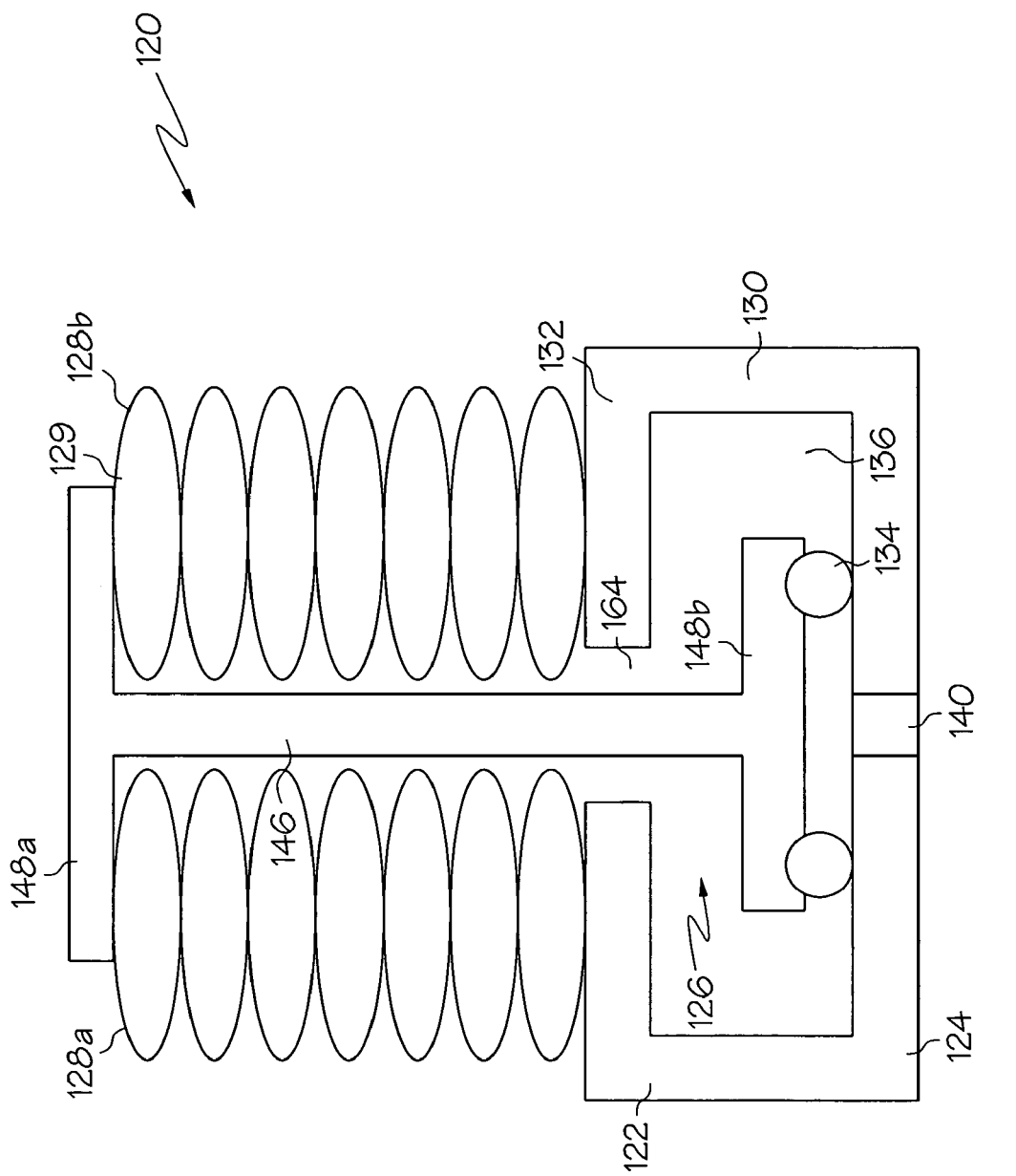
FIG. 5 is a schematic of still yet another exemplary valve that may be used with the control moment gyroscope depicted in FIG. 1.

It will be appreciated that the embodiment depicted in FIG. 2 is merely exemplary of any one of numerous configurations that can implement the above-discussed invention. For example, FIGS. 3-5 depict various other exemplary embodiments, each of which will now be discussed.

Figure 3:
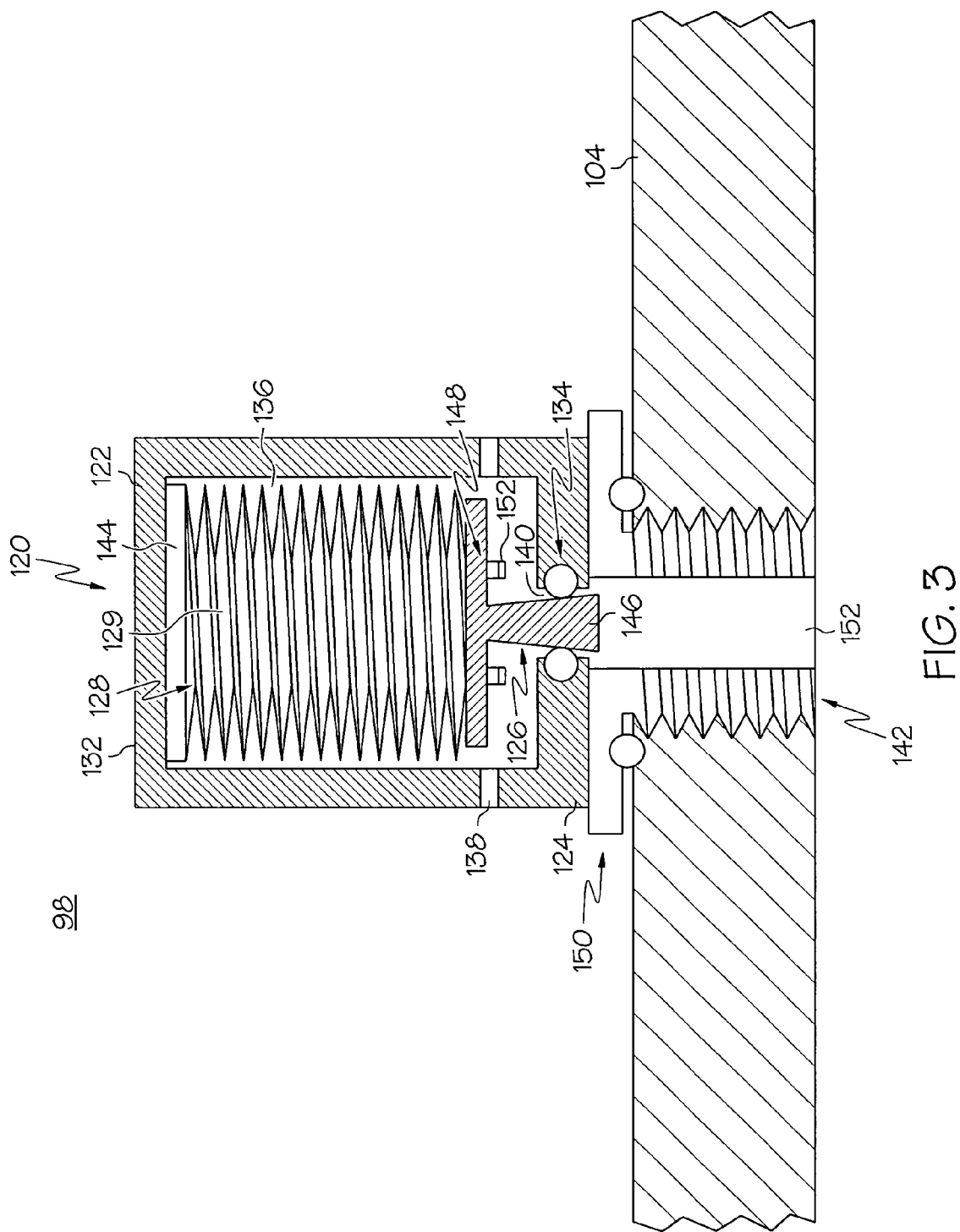
FIG. 3 is schematic of another exemplary valve that may be used with the control moment gyroscope depicted in FIG. 1.

Turning first to FIG. 3, another exemplary embodiment of the valve 120 is illustrated. Similar to the previous embodiment, the bellows 128 is disposed within the valve housing 122 and is coupled to the valve element 126. However, the valve 120 here includes several different features. For instance, the valve 120 includes an intermediate interface 150 that is threadedly engaged with the assembly opening 142. The intermediate interface 150 further includes a passage 152 formed therethrough that provides fluid communication between the valve opening 140 and the interior of the inner gimbal assembly 104.

Similar to the previous embodiment in that it includes a valve shaft 146 that is slidably disposed within the valve opening 140. However, it differs in that it includes only a single valve plate 148 that is coupled to one end of the valve shaft 146. Additionally, the valve shaft 146 is beveled so that the other end has a diameter that is larger than the valve seat opening 140. The valve seat 124 is coupled to the bottom of the valve housing 122 and seal element 134 is disposed within the valve opening 140. As with the previous embodiment, a shim 144 is positioned between the bellows 128 and top wall 132 of the housing 122. Though, as before, the valve 120 could be implemented without the shim 140. To provide further control of the length of expansion of the bellows 128, the valve plate 148 also includes a bellows stop 152 coupled thereto to provide a separation space between the valve plate 148 and the valve seat 124 such that the fluid can flow freely through the valve seat opening 140 to vent the cavity 136.

Similar to the previous embodiment, the bellows interior chamber 129 is either evacuated or pressurized. When the valve 120 is exposed to a pressure that is greater than the pressure of the bellows interior chamber 129, the bellows 128 contracts and pulls the valve shaft 146 upward until the shaft 146 contacts and seats against the seal element 128 to close the valve 120. When the valve 120 is exposed to pressure less than the pressure of the bellows interior chamber 129, the bellows 128 expands so that the shaft 146 is not in contact with the seal element 128 and the valve 120 is open. The bellows stop 152 maintains an open path between the valve plate 148 and the valve seat 124.

FIG. 4 illustrates another exemplary embodiment of the valve 120. Unlike the previous embodiment, the bellows 128 is located outside of the valve housing 122. The valve housing 122 has an extension 158. The bellows 128 is at least partially attached to the extension 158 and at least partially coupled to an L-shaped arm 160. The arm 160 is configured to move the valve element 126 between an open and a closed position in response to the expansion and contraction of the bellows 128, as will be discussed in detail further below.

The valve element 126 includes a valve shaft 146, and a valve plate 148. The valve shaft 146 is slidably disposed within a shaft opening 164 formed in the top wall 132 of the housing 122 and is coupled on either end to the arm 160 and valve plate 148. The valve plate 148 is disposed within the housing cavity 136 proximate the seal element 134 and moves vertically in response to the movement of the arm 160 and valve shaft 146. In this exemplary embodiment, the seal element 134 is coupled to the intermediate interface 150, which is disposed within the assembly opening 142 and threadedly coupled to the walls of the opening 142. The intermediate interface 150 includes a passage 152 that provides fluid communication between the valve cavity 136 and the interior of the inner gimbal assembly 104.

The bellows 128 is evacuated or pressurized so that when the bellows 128 is exposed to a pressure that is greater than the pressure of the bellows interior chamber 129, the bellows 128 contracts and pulls the arm 160 inward to cause the lever 162 to push the valve element 126 toward the valve seat 124 and contact the valve seat opening 140. When the pressure becomes substantially less than the pressure of the bellows interior chamber 129, the bellows 128 expands and pushes the arm 160 outward. This movement causes the attached lever 162 to lift the valve element 126 away from the valve seat 126 so that the valve 120 is open.

Still yet another exemplary embodiment is depicted in FIG. 5. Similar to the embodiments depicted in FIGS. 3 and 4, the valve housing 122 has sidewalls 130 and a top wall 132. The valve seat 124 is coupled to the valve housing 122 to define a cavity 136. The valve element 126 has an elongated valve shaft 146 and a first and a second plate 148a, 148b coupled to each end of the shaft 146. Positioned between the first and second plates 148a, 148b are the bellows 128a, 128b. The bellows 128a, 128b are each at least partially coupled to the top wall 132 and to the first plate 148a. Although two bellows 128a, 128b. are shown in this embodiment, it will be appreciated that fewer or more bellows may be employed as well. The second plate 148b is disposed within the cavity 136. The valve seat 124 includes a seal element 134 coupled to its top surface proximate the valve seat opening 140.

In this embodiment, the bellows 128a, 128b are evacuated or pressurized and when the valve 120 is exposed to a pressure greater than the internal pressure of the bellows 128a, 128b, the bellows 128a, 128b both contract and pull the first plate 148a downward. As a result, the shaft 146 slides downward through the shaft opening 164 causing the second plate 148b to contact the seal element 134. As the valve 120 is exposed to a pressure less than the internal pressure of the bellows 128a, 128b, the bellows 128a, 128b expand and push the first plate 148b and shaft 146 upward to cause the second plate 148b to move away from the seal element 134.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vent valve assembly comprising:
   a housing including an opening formed thereon, the housing defining an interior therein that is substantially evacuated;
   a vent valve coupled to the housing, the vent valve including:
      a valve housing including an inner surface, an outer surface, and an opening extending therebetween, the inner surface defining a cavity in fluid communication with the housing opening;
      a valve element disposed at least partially within the valve housing cavity and movable between a closed position, in which fluid is prevented from flowing through the valve housing opening into the housing interior, and an open position, in which fluid may flow through the valve housing opening into the housing interior; and
      bellows disposed at least partially within the valve housing and coupled to the valve element, the bellows having an internal chamber and configured to selectively move the valve element between the closed and open position in response to a differential pressure between the bellows internal chamber and the valve housing cavity.

2. The vent valve assembly of claim 1, further comprising a valve seat coupled to the valve housing.

3. The vent valve assembly of claim 2, wherein the valve seat is disposed within the valve housing opening.

4. The vent valve assembly of claim 3, wherein the valve seat comprises an O-ring.

5. The vent valve assembly of claim 2, wherein the valve seat is coupled to the valve housing and disposed within the valve housing opening, the valve seat having a valve opening extending therethrough.

6. The vent valve assembly of claim 5, wherein the valve element comprises a plate and a shaft having first and second ends, the plate coupled between the first end of the shaft and the bellows and the second end of the shaft at least partially slidably disposed within the valve opening.

7. The valve of claim 6 wherein the second end of the shaft has a diameter that is larger than the diameter of the valve opening.

8. The vent valve assembly of claim 1, wherein the valve housing comprises at least one wall and the valve further comprises at least one vent opening formed into the at least one wall.

9. The vent valve assembly of claim 1, wherein the internal chamber of the bellows is evacuated.

10. The valve of claim 1, wherein the valve element comprises a first plate, a second plate, and a shaft coupled therebetween, the first plate coupled to the bellows and the second plate disposed within the cavity.

11. The valve of claim 1, wherein the bellows is pressurized to a predetermined pressure magnitude and the valve is in the open position when the predetermined pressure magnitude is substantially equal to ambient pressure.

12. The valve of claim 11, wherein:
the housing is a CMG housing and includes an aperture formed therein;
the valve housing further comprises at least one wall, an extension, and an intermediate interface, the extension coupled between the at least one wall and the bellows; and
the intermediate interface configured to couple to the CMG housing and to be disposed within the CMG housing aperture.

13. The valve of claim 12, wherein the intermediate interface has a passage formed therein to provide fluid communication between the CMG housing interior and the housing opening.

14. The valve of claim 1, wherein:
the valve housing further comprises at least one wall, an extension, and an intermediate interface, the extension coupled between the at least one wall and the bellows; and
the valve further comprises an arm coupled between the bellows and the valve element.

15. The valve of claim 14, wherein the valve element further comprises a lever, a shaft, and a plate, the arm coupled to the lever and the shaft coupled between the lever and the plate.

* * * * *